Sept. 9, 1969   M. R. KIMBER   3,466,025
WEDGE-CUTTING FIXTURE FOR A RADIAL ARM SAW
Filed July 7, 1967
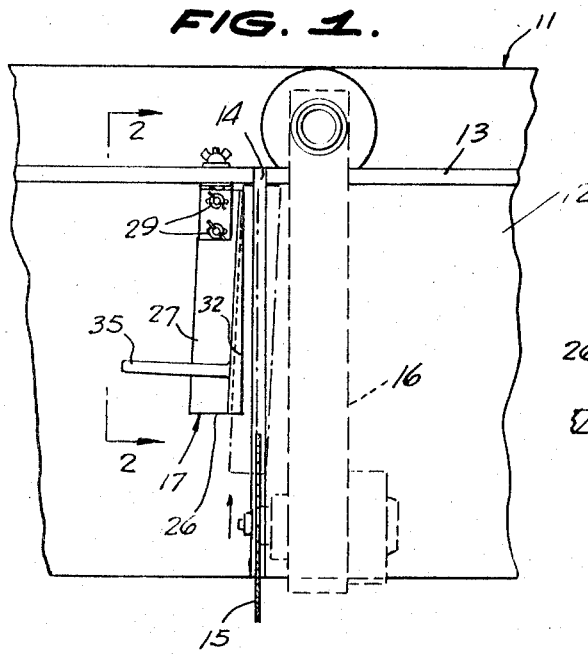
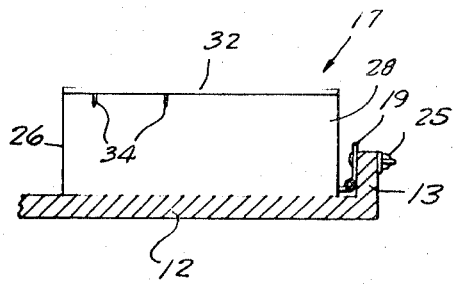
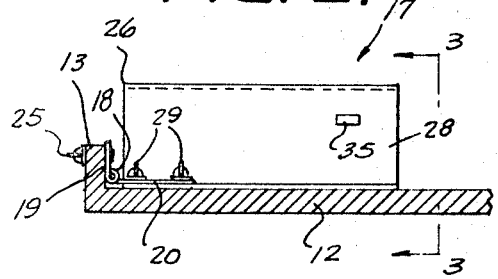
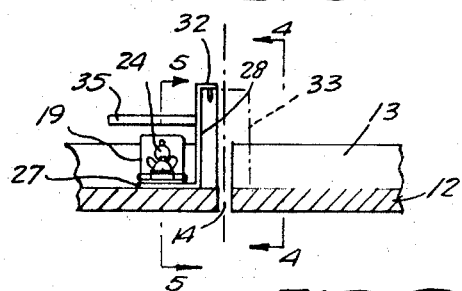
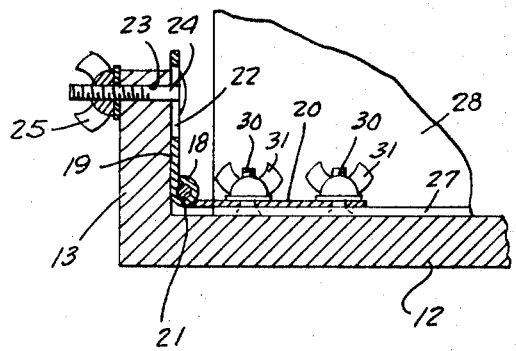
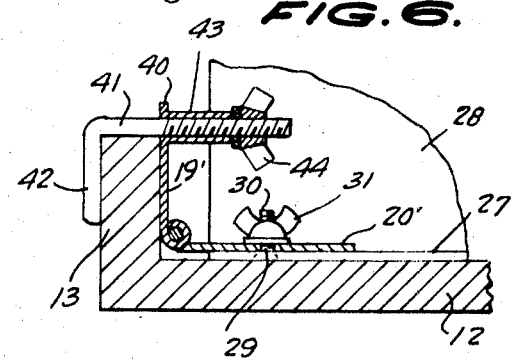
INVENTOR.
MELVIN R. KIMBER,
BY
*Berman, Davidson & Berman*
ATTORNEYS.

United States Patent Office

3,466,025
Patented Sept. 9, 1969

3,466,025
WEDGE-CUTTING FIXTURE FOR A RADIAL ARM SAW
Melvin R. Kimber, 1701 Aspen St.,
Fort Collins, Colo. 80521
Filed July 7, 1967, Ser. No. 651,726
Int. Cl. B23q *1/00, 3/02;* B27b *27/06*
U.S. Cl. 269—53                                8 Claims

ABSTRACT OF THE DISCLOSURE

A wedge-cutting fixture for a radial arm saw of the type having a table provided with an upstanding fence rib and a transverse saw slot intersecting the rib. The fixture consists of a hinged assembly having two leaves. One of the leaves is fastened by a bolt to the fence rib adjacent the saw slot. The other leaf is adjustably-fastened to the horizontal bottom flange of an angle bar with the vertical web thereof extending alongside the saw slot and at an adjusted angle thereto. The vertical web is provided with a top clamping flange adapted to overlie and engage on the top edge of a wood block from which a desired wedge is to be cut. The clamping flange has depending prongs adapted to penetrate into the top edge of the block to hold it against shifting. The vertical web is provided with an outwardly-projecting substantially horizontal handlebar.

---

This invention relates to woodworking tools, and more particularly to a wedge-cutting fixture for use on a radial arm saw machine of the type having a table provided with an upstanding fence rib with a transverse saw slot intersecting the rib.

A main object of the invention is to provide a novel and improved wedge-cutting fixture for a radial arm saw machine, the fixture being simple in construction, being easy to install, being easy to adjust to provide a wedge of desired inclination, and being safe to use.

A further object of the invention is to provide an improved wedge-cutting fixture for a radial arm saw machine, said fixture being inexpensive to manufacture, being durable in construction, providing a wide range of adjustments, being adaptable for use on many different designs of radial arm saw machines, and having means to firmly hold a wood block in place for cutting a desired wedge therefrom.

Further objects and advantages of the invention will become apparent from the following description and claims, and from the accompanying drawing, wherein:

FIGURE 1 is a top view of a fragmentary portion of a radial arm saw machine provided with an improved wedge-cutting fixture constructed in accordance with the present invention.

FIGURE 2 is a fragmentary transverse vertical cross-sectional view taken substantially on the line 2—2 of FIGURE 1.

FIGURE 3 is a fragmentary vertical cross-sectional view taken substantially on the line 3—3 of FIGURE 2.

FIGURE 4 is a vertical cross-sectional view taken substantially on the line 4—4 of FIGURE 3.

FIGURE 5 is an enlarged cross-sectional view taken substantially on the line 5—5 of FIGURE 3.

FIGURE 6 is a cross-sectional view generally similar to FIGURE 5, but showing a modification of the wedge-cutting fixture.

Referring to the drawing, and more particularly to FIGURES 1 to 5, 11 generally designates a conventional radial arm saw machine of the type having a horizontal table 12 provided with an upstanding fence rib 13 and having a transverse slot 14 intersecting the rib and providing clearance for the swinging movements of a rotary saw blade 15 carried on the swinging arm 16 of the machine.

Designated generally at 17 is a wedge-cutting fixture according to the present invention. The fixture 17 comprises a hinge assembly 18 having a vertical leaf 19 and a horizontal leaf 20 pivoted relative to each other by a hinge pin 21. The vertical leaf 19 is formed with a slot 22, and engaged through the slot 22 and through an aperture 23 provided in the upper portion of fence rib 13 adjacent slot 14 is a horizontal fastening bolt 24 provided with a wing nut 25.

Provided at 26 is an angle bar having a horizontal bottom flange 27 and a vertical web 28. Flange 27 underlies the horizontal hinge leaf 20 and is adjustably-secured thereto. Thus, the leaf 20 is provided with a pair of spaced transverse slots 29, 29 which receive upstanding bolts 30, 30 engaged through the inner end portion of flange 27 and provided with wing nuts 31, 31 for clamping leaf 20 to flange 27 in a desired position of angular adjustment, the slots 29, 29 being of sufficient width to allow a substantial amount of play of the bolts 30, 30 therein so as to permit the desired range of angular adjustment of angle bar 17 relative to hinge leaf 20 in a horizontal plane.

The vertical web 28 is provided at its top edge with a clamping flange 32 directed away from the bottom flange 27, namely, directed toward the saw slot 14, as viewed in FIGURE 1. Flange 32 is adapted to overlie and engage on the top edge of a wooden block 33 from which a desired wedge is to be cut. Flange 32 is provided with a plurality of spaced depending prongs 34 which are adapted to penetrate into the top edge of the block 33 to hold it against shifting while it is being cut.

The upstanding web 28 is provided at its forward portion with the substantially horizontal, outwardly-projecting handlebar 35 which extends substantially perpendicular to the web 28 and extends away from the saw blade 15, as can be readily seen from FIGURE 1. Handlebar 35 is preferably located near the upper forward corner of web 28 so that it can be easily grasped and can be employed to exert downward holding force on a block 33 engaged beneath flange 32 in the manner illustrated in FIGURE 1, namely, with the rear end of the block in abutment with the fence rib 13 and with the block overlying the saw slot 14 in position to be cut. Thus, in using the fixture, the angle bar 17 is first adjusted to the correct angle, in accordance with the desired inclination of the wedge to be cut. A block 33 is then placed over the slot 14, being received beneath flange 32 and being engaged with web 28, with its rear end substantially in abutment with rib 13. Angle bar 26 is then pressed downwardly by means of handlebar 35, to cause the prongs 34 to penetrate into the top edge of the block 33. While the operator continues to exert downward holding force on the handlebar 35 he swings the arm 16 to move the saw blade 15 through the slot 14, thereby cutting off the desired wedge.

In the form of the invention shown in FIGURES 1 to 5, an aperture 23 must be provided in the upper portion of the fence rib 13 to receive the fastening bolt 24. In the form of the invention illustrated in FIGURE 6, no such aperture is required. In the arrangement shown in FIGURE 6, the upper hinge leaf member, shown at 19' projects upwardly a sufficient distance above the top edge of the fence rib 13 to provide space for an aperture 40 in the upper portion of leaf 19', located slightly above the top edge of rib 13. Through aperture 40 is engaged an L-shaped clamping bolt 41 whose depending clamping arm 42 extends vertically and engages against the outer side of rib 13. A clamping sleeve 43 is provided on the inner portion of the shank of bolt 41 and a wing nut 44 is engaged on the shank for clamping leaf 19' to rib 13 when the wing nut is tightened, as is apparent from FIGURE 6. The lower hinge leaf, shown at 20' may be provided with one or more transverse slots 29, as above-described, for receiving the upstanding fastening bolts 30 employed in conjunction with their associated wing nuts 31 for clamping the bottom flange 27 to the hinge leaf 20' at a desired position of angular adjustment in a horizontal plane on the saw table 12.

While certain specific embodiments of an improved wedge-cutting fixture for a radial arm saw machine have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wedge-cutting fixture for a radial arm saw of the type having a table provided with an upstanding fence rib and a saw slot transverse of said rib, said fixture comprising a hinge assembly having two leaves, means to secure one of the leaves vertically to a fence rib of a radial arm saw adjacent the saw slot thereof with the other leaf extending horizontally over the table, an angle bar having a horizontal bottom flange and a vertical web, means to adjustably-secure said horizontal flange to said horizontally-extending other leaf with the vertical web extending alongside the saw slot, and means on said vertical web clampingly-engageable on the top edge of a wood block held against the web.

2. The wedge-cutting fixture of claim 1, and wherein said last-named means comprises a horizontal block-retaining flange on the top edge of said vertical web directed oppositely to said bottom flange.

3. The wedge-cutting fixture of claim 2, and wherein the means to adjustably-secure the bottom horizontal flange and said horizontally-extending leaf, comprises at least one upstanding bolt engaged through the bottom flange and said horizontally-extending leaf, and a clamping nut threaded on said bolt.

4. The wedge-cutting fixture of claim 3, and a handlebar rigidly-secured to said vertical web and extending substantially horizontally over said bottom flange.

5. The wedge-cutting fixture of claim 4, and wherein said handlebar is located adjacent the forward upper corner of said vertical web.

6. The wedge-cutting fixture of claim 5, and wherein said handlebar is substantially perpendicular to said vertical web.

7. The wedge-cutting fixture of claim 2, and wherein said horizontally-extending leaf overlies said horizontal bottom flange, said horizontally-extending leaf being formed with a pair of spaced transverse slots, and respective vertical bolts extending through said horizontal bottom flange and adjustably-engaged through said slots, said bolts being provided with respective clamping nuts threaded thereon.

8. The wedge-cutting fixture of claim 7, and a plurality of depending prongs on said horizontal block-retaining flange, and outwardly-projecting handle means on said vertical web extending transversely over said horizontal bottom flange.

References Cited
UNITED STATES PATENTS

| | | | |
|---|---|---|---|
| 1,173,760 | 2/1916 | Williams | 269—54 |
| 1,429,097 | 9/1922 | Phillips | 143—169 |
| 2,753,899 | 7/1956 | Murphin | 269—54 |

ANDREW R. JUHASZ, Primary Examiner

F. R. BILINSKY, Assistant Examiner

U.S. Cl. X.R.

143—6, 157, 169; 269—94